(12) United States Patent
Rogers

(10) Patent No.: US 9,541,212 B2
(45) Date of Patent: Jan. 10, 2017

(54) TOOL-LESS VALVE STEM CONNECTOR ASSEMBLY FOR A GLOBE VALVE ASSEMBLY

(71) Applicant: SCHNEIDER ELECTRIC BUILDINGS, LLC, Palatine, IL (US)

(72) Inventor: Michael Rogers, Hampstead, NH (US)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 256 days.

(21) Appl. No.: 14/462,650

(22) Filed: Aug. 19, 2014

(65) Prior Publication Data

US 2016/0053897 A1 Feb. 25, 2016

(51) Int. Cl.
  *F16K 1/02* (2006.01)
  *F16K 31/04* (2006.01)
  *F16K 1/48* (2006.01)
  *F16K 31/524* (2006.01)

(52) U.S. Cl.
  CPC ........ *F16K 31/04* (2013.01); *F16K 1/02* (2013.01)

(58) Field of Classification Search
  CPC ............ F16K 31/04; F16K 1/487; F16K 1/04; F16K 31/52408; F16K 1/02
  USPC .................................. 251/291, 251, 293, 296
  See application file for complete search history.

(56) References Cited

U.S. PATENT DOCUMENTS

| | | | |
|---|---|---|---|
| 1,300,717 A * | 4/1919 | Fulton ................. | G05D 23/126 122/451.2 |
| 1,540,529 A | 6/1925 | Blaisdell | |
| 1,764,991 A | 6/1930 | Siebs | |
| 2,622,763 A | 12/1952 | MacGregor | |
| 2,647,532 A * | 8/1953 | Hopwood ............... | F16K 35/04 137/315.27 |
| 2,693,934 A * | 11/1954 | Meldgaard .............. | F16K 35/06 251/291 |
| 3,213,887 A | 10/1965 | Angelery | |
| 3,290,003 A | 12/1966 | Kessler | |
| 3,430,919 A | 3/1969 | Frazier | |
| 3,472,269 A | 10/1969 | Scholle | |
| 3,532,109 A * | 10/1970 | Smith ...................... | E03B 9/02 137/296 |
| 3,572,382 A | 3/1971 | Luthe | |
| 3,575,213 A | 4/1971 | Schnall | |
| 3,648,718 A | 3/1972 | Curran | |
| 3,838,707 A | 10/1974 | Wachowitz, Jr. | |

(Continued)

OTHER PUBLICATIONS

Extended European Search Report from corresponding European Application No. 15180656.9 dated Feb. 19, 2016.

*Primary Examiner* — Marina Tietjen
(74) *Attorney, Agent, or Firm* — Lando & Anastasi, LLP

(57) ABSTRACT

A valve stem connector assembly, which connects a lead screw of a globe valve actuator to a valve stem of a globe valve, includes a retainer secured to the lead screw. The retainer includes a retainer body and at least one cam rotatably secured to the retainer. The valve stem connector assembly further includes a retainer latch coupled to the lead screw and the retainer. The retainer latch is configured to move from a normally unlocked position in which the valve stem is unsecured from the lead screw and a locked position in which the retainer latch moves toward the retainer to rotate the at least one cam to secure the valve stem to the lead screw. A method of releasably securing a valve stem of a globe valve to a lead screw of a globe valve actuator is further disclosed.

20 Claims, 13 Drawing Sheets

(56) References Cited

U.S. PATENT DOCUMENTS

| | | |
|---|---|---|
| 3,958,275 A | 5/1976 | Morgan et al. |
| 3,990,475 A | 11/1976 | Myers |
| 4,237,936 A | 12/1980 | Lollis et al. |
| 4,436,105 A | 3/1984 | Goans |
| 4,570,665 A | 2/1986 | Zimmerly |
| 4,693,451 A | 9/1987 | Tricini |
| 4,832,311 A | 5/1989 | Kimura |
| 5,288,052 A | 2/1994 | Black et al. |
| 5,365,759 A | 11/1994 | Bonomi |
| 5,772,182 A | 6/1998 | Stambaugh, Sr. et al. |
| 6,206,024 B1 | 3/2001 | Naberhaus |
| 6,394,135 B2 | 5/2002 | Erickson et al. |
| 6,851,658 B2 | 2/2005 | Fitzgerald et al. |
| 7,017,608 B2 | 3/2006 | Erickson et al. |
| 7,083,160 B2 | 8/2006 | Baumann |
| 7,159,617 B2 | 1/2007 | Erickson et al. |
| 7,721,753 B2 | 5/2010 | Wears |
| 7,926,784 B2 | 4/2011 | Fleming |
| 2005/0012065 A1 | 1/2005 | Baumann |
| 2006/0006356 A1 | 1/2006 | Hansson et al. |
| 2009/0320931 A1 | 12/2009 | Wears |
| 2010/0270491 A1 | 10/2010 | Faas |
| 2011/0240901 A1 | 10/2011 | Evertz et al. |
| 2012/0068099 A1 | 3/2012 | Sealy |
| 2012/0211688 A1 | 8/2012 | Carlson et al. |
| 2014/0020909 A1 | 1/2014 | McKeon et al. |

\* cited by examiner

TOOL-LESS VALVE STEM CONNECTOR ASSEMBLY FOR A GLOBE VALVE ASSEMBLY

BACKGROUND

1. Field of Disclosure

The present disclosure relates generally to valves, and more particularly to globe valves and globe valve actuators that are used in HVAC systems, and a tool-less valve stem connector assembly that is used to secure a lead screw of the globe valve actuator to a valve stem of the globe valve.

2. Discussion of Related Art

In heating, ventilation, and air conditioning (HVAC) systems, globe valves are used for applications requiring throttling and shut off with an actuator that provides an operating force to aid in closing and opening of the valve as required. A typical globe valve includes a generally spherical body with two halves of the spherical body being separated by an internal baffle, which has an opening formed therein. The opening creates a valve seat in which a movable valve or plug is seated. An actuator, either manual or automatic, can be used to manipulate the movement of the plug to open and close the valve.

Typically, a conventional method used to connect a globe valve actuator to a valve stem of a globe valve requires the use of a tool and both hands to securely fasten the globe valve actuator to the bonnet, which is labor intensive. The added time required to secure the globe valve actuator to the valve stem of the globe valve can increase an "installed" cost associated with the globe valve.

SUMMARY OF DISCLOSURE

One aspect of the disclosure is directed to a valve stem connector assembly to connect a lead screw of a globe valve actuator to a valve stem of a globe valve. In one embodiment, the valve stem connector assembly includes a retainer secured to the lead screw. The retainer includes a retainer body and at least one cam rotatably secured to the retainer. The valve stem connector assembly further includes a retainer latch coupled to the lead screw and the retainer. The retainer latch is configured to move from a normally unlocked position in which the valve stem is unsecured from the lead screw and a locked position in which the retainer latch moves toward the retainer to rotate the at least one cam to secure the valve stem to the lead screw.

Embodiments of the valve stem connector assembly further may include providing a retainer body that is generally cylindrical and sized to fit over a lower end of the lead screw of the valve actuator. The retainer body may include an outer surface and an inner surface having an inwardly projecting annular rim configured to snap fit into a recess formed in the lower end of the lead screw. The retainer further may include at least one cam retention formation formed on the retainer body of the retainer to rotatably secure the at least one cam to the retainer body. The at least one cam may include a cam body having a cam surface configured to initially engage the retainer latch to move the at least one cam from the normally unlocked position to the locked position. The at least one cam further may include a recessed portion formed in the cam body, with the recessed portion being configured to receive the retainer latch therein to maintain the at least one cam in the locked position. The at least one cam further may include a protrusion configured to engage the valve stem of the globe valve assembly within the annular recess provided in the valve stem when the retainer latch is in the locked position. The retainer latch may include a generally cylindrical retainer latch body that is configured to slip over the lead screw of the globe valve actuator and a portion of the retainer. The retainer latch body of the retainer may include at least one cam actuator formed on the retainer latch body on the outer surface of the retainer latch body, with the at least one cam actuator projecting downwardly from a lower edge of the retainer latch body to engage the cam surface of the at least one cam to rotate the at least one cam. The retainer latch body further may include at least one protrusion formed on the retainer latch body inboard of the at least one actuator to form a slot that is configured to receive a portion of the cam body of the at least one cam therein when the protrusion enters the recessed portion formed in the cam body. The retainer latch further may include a release feature configured to release the retainer latch from the retainer. The retainer further may include at least one spring formation formed on the retainer body, with the at least one spring formation being configured to engage the inner surface of the retainer latch to secure the retainer latch to the retainer when in the retainer latch is in the locked position.

Another aspect of the disclosure is directed to a method of releasably securing a valve stem of a globe valve to a lead screw of a globe valve actuator. In one embodiment, the method comprises: securing a retainer to the lead screw, the retainer including a retainer body and at least one cam rotatably secured to the retainer; and moving a retainer latch coupled to the lead screw and the retainer from an unlocked position in which the valve stem is unsecured from the lead screw to a locked position in which the retainer latch moves toward the retainer to rotate the at least one cam to secure the valve stem to the lead screw.

Embodiments of the method further may include releasing the retainer latch from the retainer with a release feature formed on the retainer latch. Moving the retainer latch may include engaging a cam surface of the at least one cam to move the at least one cam from a normally unlocked position to the locked position. Engaging the cam surface may include engaging at least one cam actuator formed on the retainer latch body on the outer surface of the retainer latch body to the cam surface to rotate the at least one cam. Engaging the cam surface further may include inserting at least one protrusion formed on the retainer latch body inboard of the at least one cam actuator into a recessed portion formed in the cam body. The retainer latch further may include receiving the retainer latch within a recessed portion formed in the cam body. Moving the retainer latch further may include inserting a protrusion of the at least one cam into the annular recess provided in the valve stem. The retainer further may include at least one spring formation formed on the retainer body, the at least one spring formation being configured to engage the inner surface of the retainer latch to secure the retainer latch to the retainer when in the retainer latch is in the locked position.

BRIEF DESCRIPTION OF THE DRAWINGS

Various aspects of at least one embodiment are discussed below with reference to the accompanying figures, which are not intended to be drawn to scale. Where technical features are followed by references signs, the reference signs have been included for the sole purpose of increasing the intelligibility of the figures, detailed description, and claims. Accordingly, neither the reference signs nor their absence are intended to have any limiting effect on the scope of any claim elements. Each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

DETAILED DESCRIPTION

Embodiments of the present disclosure may include a valve stem connector assembly that is configured to releasably secure a lead screw of a globe valve actuator to a bonnet of a globe valve assembly without tools. As noted above, the globe valve actuator is provided to control the operation of the globe valve assembly. In one embodiment, the connector assembly includes a retainer that is used to secure components of the connector assembly to the lead screw provided on the globe valve actuator. The lead screw is fastened to a valve stem or shaft of a globe valve, which may be already installed on the valve actuator. The assembly is provided in an orientation that is ready to receive the valve stem of the globe valve in preparation for subsequent locking. As the lead screw approaches the sub-assembly of the connector assembly, a retainer latch of the connector assembly engages retainer cams, which are mounted on the retainer. The cams are then set in motion by the downward movement of the retainer latch to grasp or otherwise capture a groove provided on the valve stem. The assembly can then achieve a locked configuration in which the cams are engaged in the groove of the valve stem, with the retainer latch locking the cams in place. This movement can take place hands free and requires minimal or no installation time.

Embodiments of the globe valve actuator may include an output shaft of the globe valve actuator that is driven by a motor in the globe valve actuator. The output shaft drives the rotation of a worm gear provided on the output shaft, which in turn engages the lead screw to move the lead screw up and down within a yoke provided on the globe valve actuator. Embodiments of the connector assembly may include pressing steel pins into the retainer to encapsulate the cams while allowing the cams to rotate. The arrangement is such that the retainer latch moves freely over the non-rotating actuator lead screw of the globe valve actuator, with the retainer being snap fit into flattened grooves in the lead screw. The retainer latch snaps over spring loaded features in the retainer to effectively spring load the retainer latch. When cams meet a top surface of the valve stem of the globe valve, the cams rotate upon contact against the spring loaded features. Once the cams rotate to their vertical orientation, top notches in the cams align with a ridge in the retainer to lock them into place, thereby retaining a groove of the valve stem and the spring features to provide a pre-load to maintain the locked position.

Figure 1:
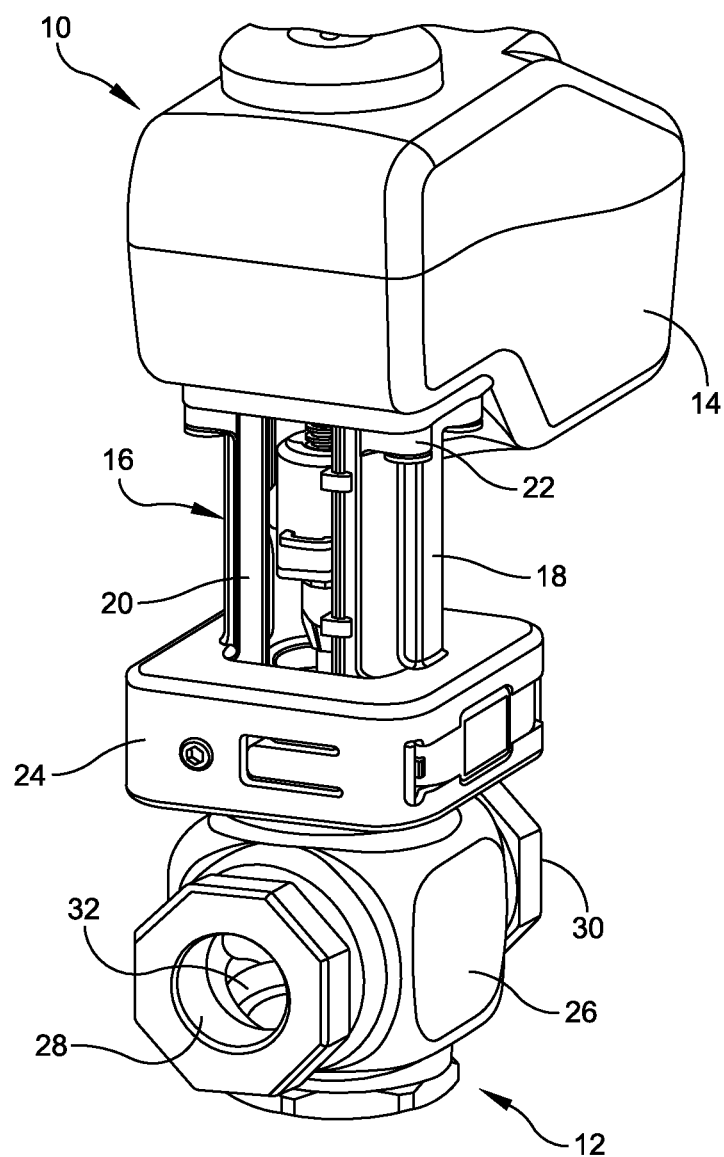
FIG. 1 is a perspective view of a globe valve actuator with a valve stem connector assembly of an embodiment of the present disclosure that is configured to secure the globe valve actuator to a globe valve assembly.

Referring to the drawings, and more particularly to FIG. 1, a globe valve actuator, generally indicated at 10, is configured to operate a globe valve assembly, generally indicated at 12. As shown, the globe valve actuator 10 includes a housing 14 designed to house the working components of the globe valve actuator and a yoke assembly, generally indicated at 16, having a yoke 18 that is secured the housing of the globe valve actuator. The yoke 18 includes a generally rectangular-shaped yoke body 20 and a mounting flange 22 configured to be secured, e.g., by screw fasteners, to the housing 14 of globe valve actuator 10. The yoke 18 is configured to house the components of a valve stem connector assembly, which connects a lead screw of the globe valve actuator 10 to a valve stem of the globe valve assembly 12. The globe valve actuator 10 further may include a controller to control the operation of the globe valve actuator to activate and deactivate the globe valve assembly 12.

In one embodiment, the yoke 18 of the yoke assembly is connected to the globe valve assembly 12 by a globe valve connector assembly 24 to secure the globe valve assembly with respect to the globe valve actuator. Reference can be made to U.S. patent application Ser. No. 14/444,204, filed on Jul. 29, 2014, and entitled TOOL-LESS VALVE ACTUATOR CONNECTOR FOR A GLOBE VALVE ASSEMBLY, which is owned by the assignee of the present disclosure and incorporated by reference herein. As shown, the globe valve connector assembly 24 is provided at a lower end of the body 20 of the yoke 18 to secure the globe valve assembly 12 to the globe valve actuator 10.

The globe valve assembly 12, otherwise referred to simply as a globe valve, which can be a two-port valve, meaning the globe valve has a housing 26 with an inlet 28 and an outlet 30, although a three port valve may also be provided. With a typical globe valve, such as globe valve 12, the inlet 28 and the outlet 30 of the globe valve 12 may be oriented straight across from each other or anywhere on the housing. A typical globe valve, such as globe valve 12, includes a cage, which is disposed within a chamber 32 of the housing 26 between the inlet 28 and the outlet 30, and is configured to include a valve seat.

The globe valve 12 further includes a valve member or plug, which is disposed within the cage, with the cage guiding the movement of the valve member during operation. The valve member is movable within the cage between a closed position in which the valve member is seated on the valve seat of the cage and an open position in which the valve member is spaced from the valve seat to enable fluid communication between the inlet 28 and the outlet 30 of the housing 26 in the well-known manner. The valve member can be provided in a normally open position in which the globe valve actuator 10 is designed to close the valve member during operation or a normally closed position in which the globe valve actuator is designed to open the valve member during operation.

Figure 6:
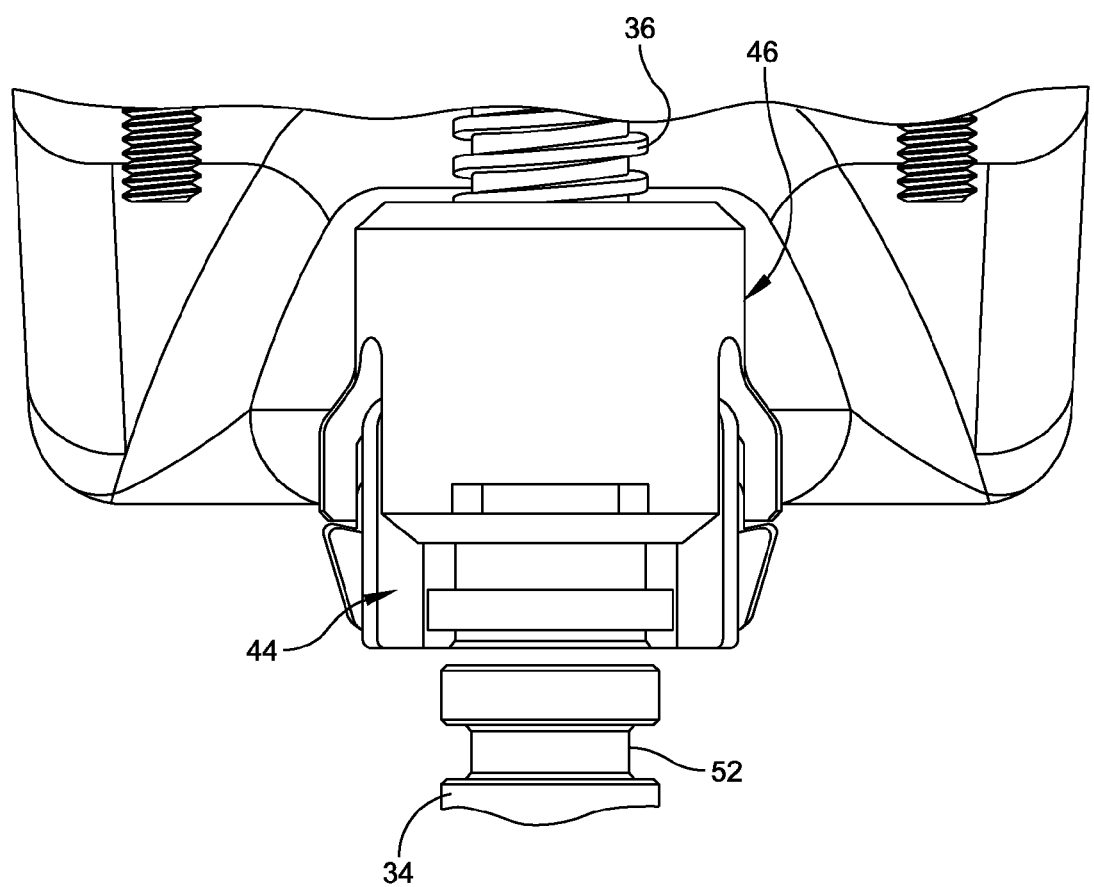
FIGS. 6-11 are enlarged cross-sectional views of a portion of the connector assembly.
Figure 7:
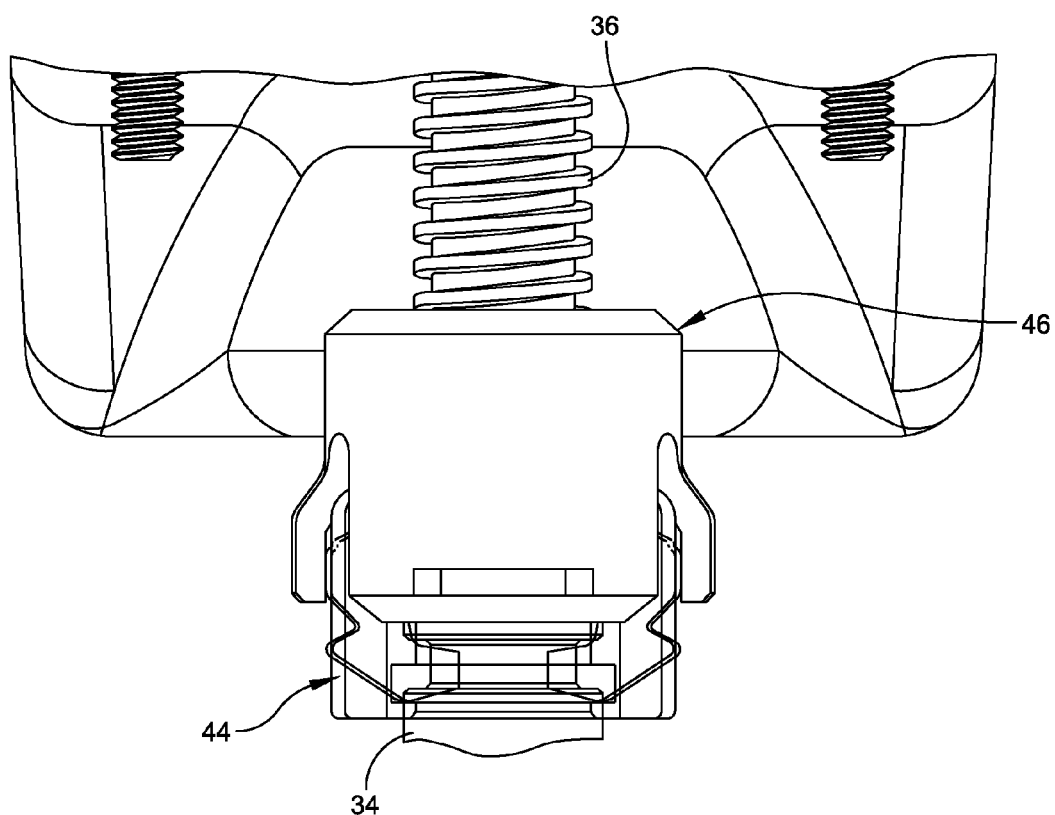

The globe valve assembly 12 further includes a bonnet, which can be threaded to the housing 26 of the globe valve 12, and slid over a valve stem 34 (shown in FIG. 6), which is axially movable within the bonnet. The valve member is secured to an end of the valve stem 34, with the valve stem being configured to move the valve member upon axially moving the valve stem. The bonnet also contains packing material, which may embody a wearable material that maintains the seal between the bonnet and the valve stem 34 during valve cycling. In one embodiment, the bonnet may be a U-style bonnet.

Figure 2:
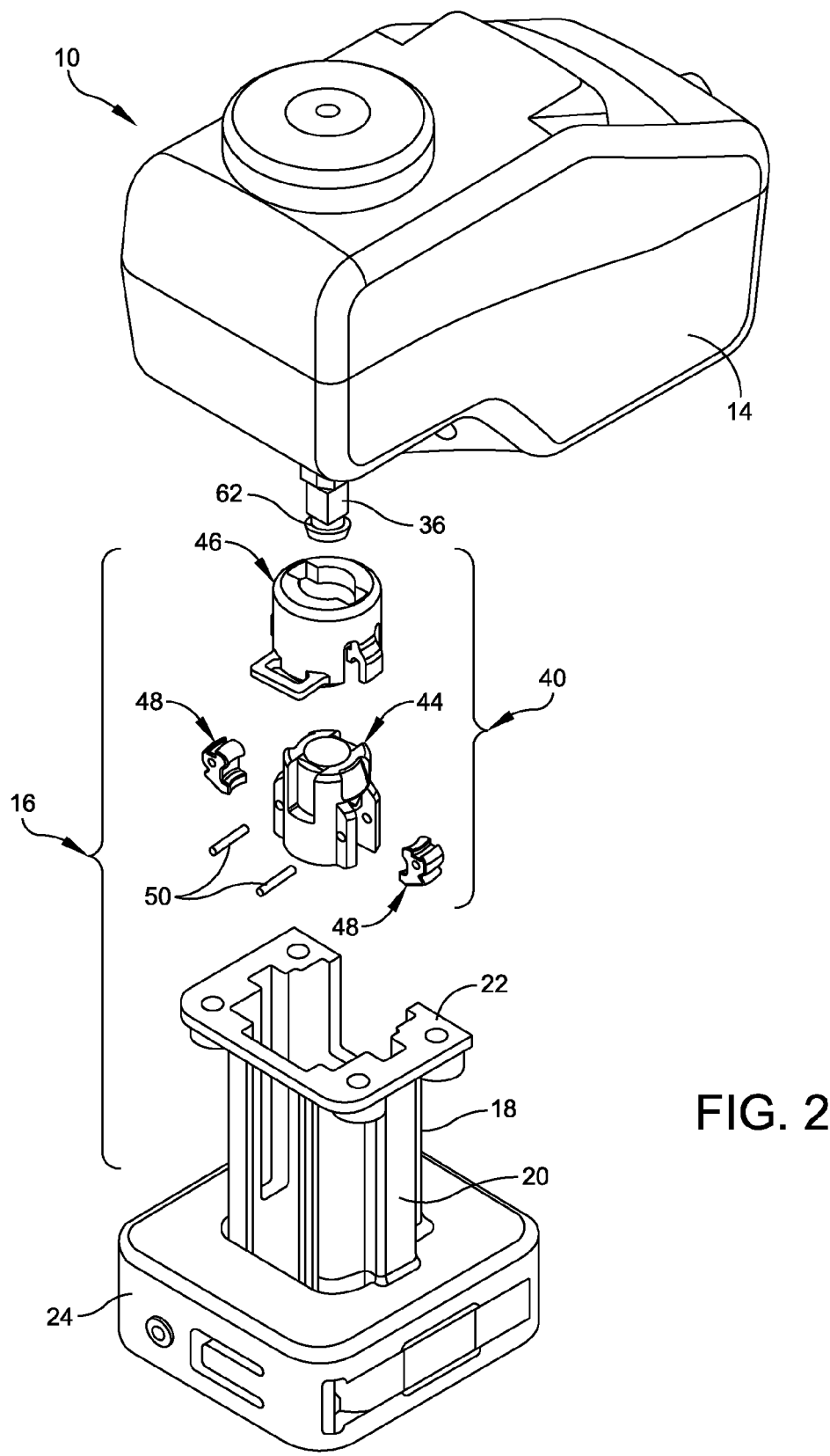
FIG. 2 is an exploded perspective view of the globe valve actuator and the connector assembly.
Figure 3:
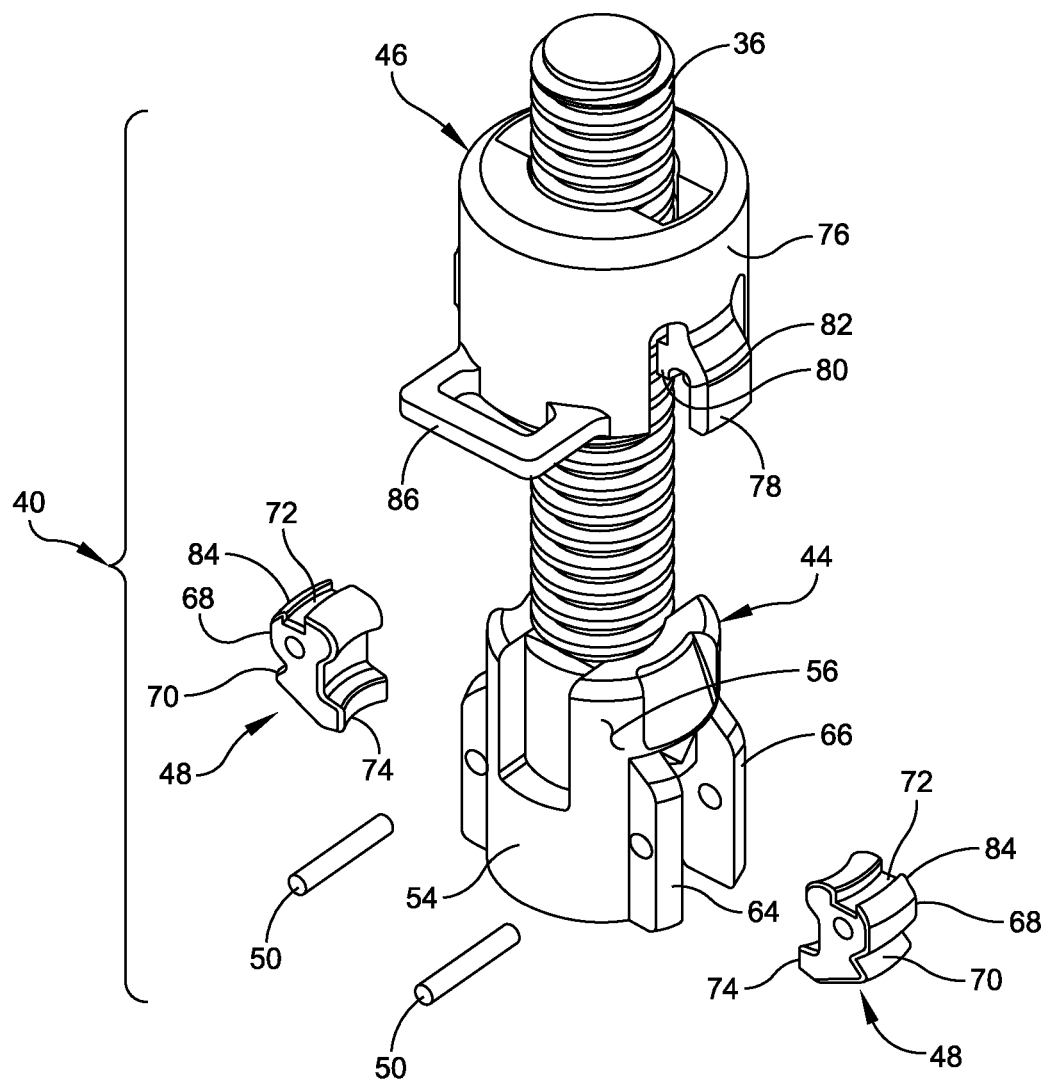
FIG. 3 is an enlarged exploded perspective view of the connector assembly.
Figure 4:
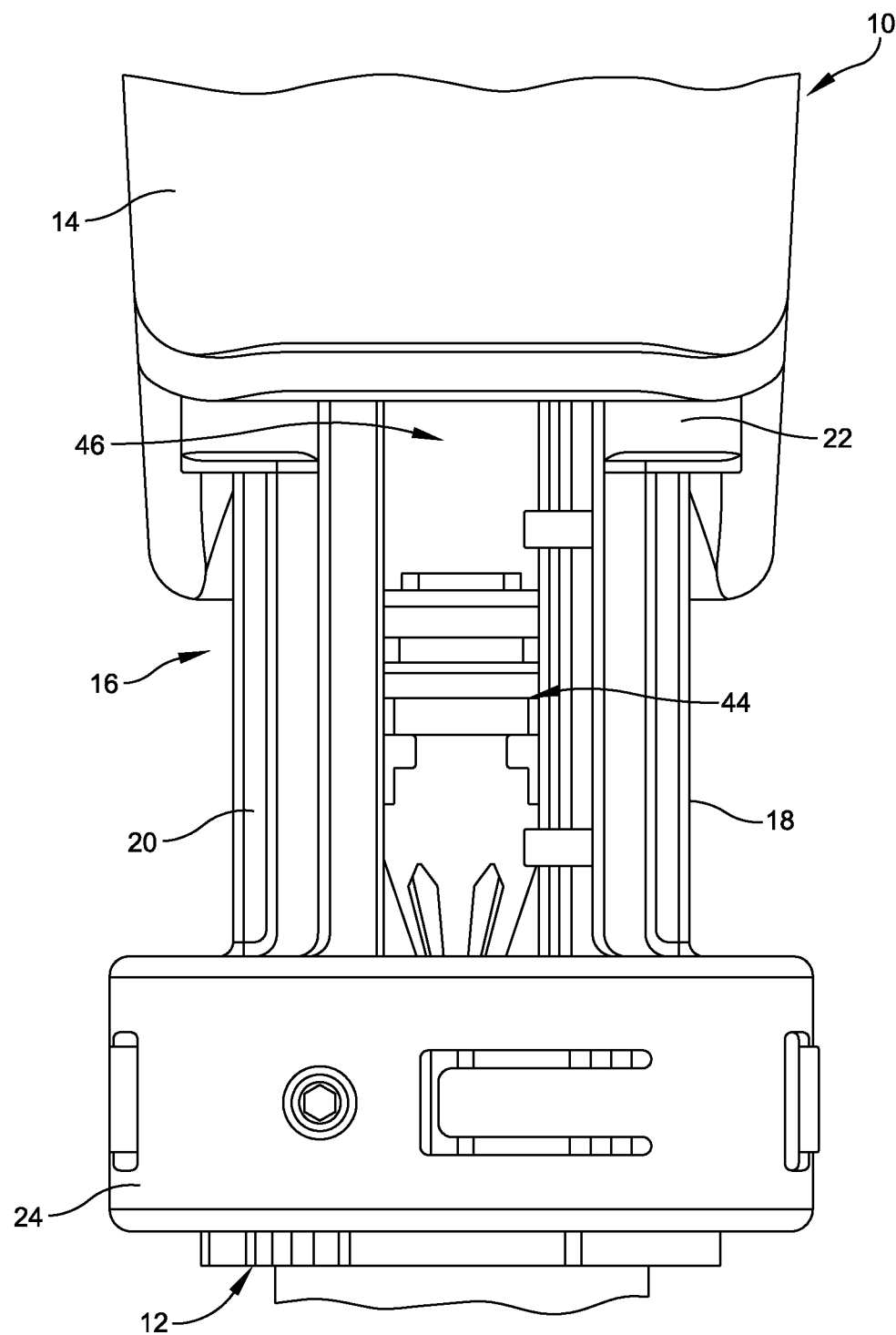
FIGS. 4 and 5 are cross-sectional views of the connector assembly.
Figure 5:
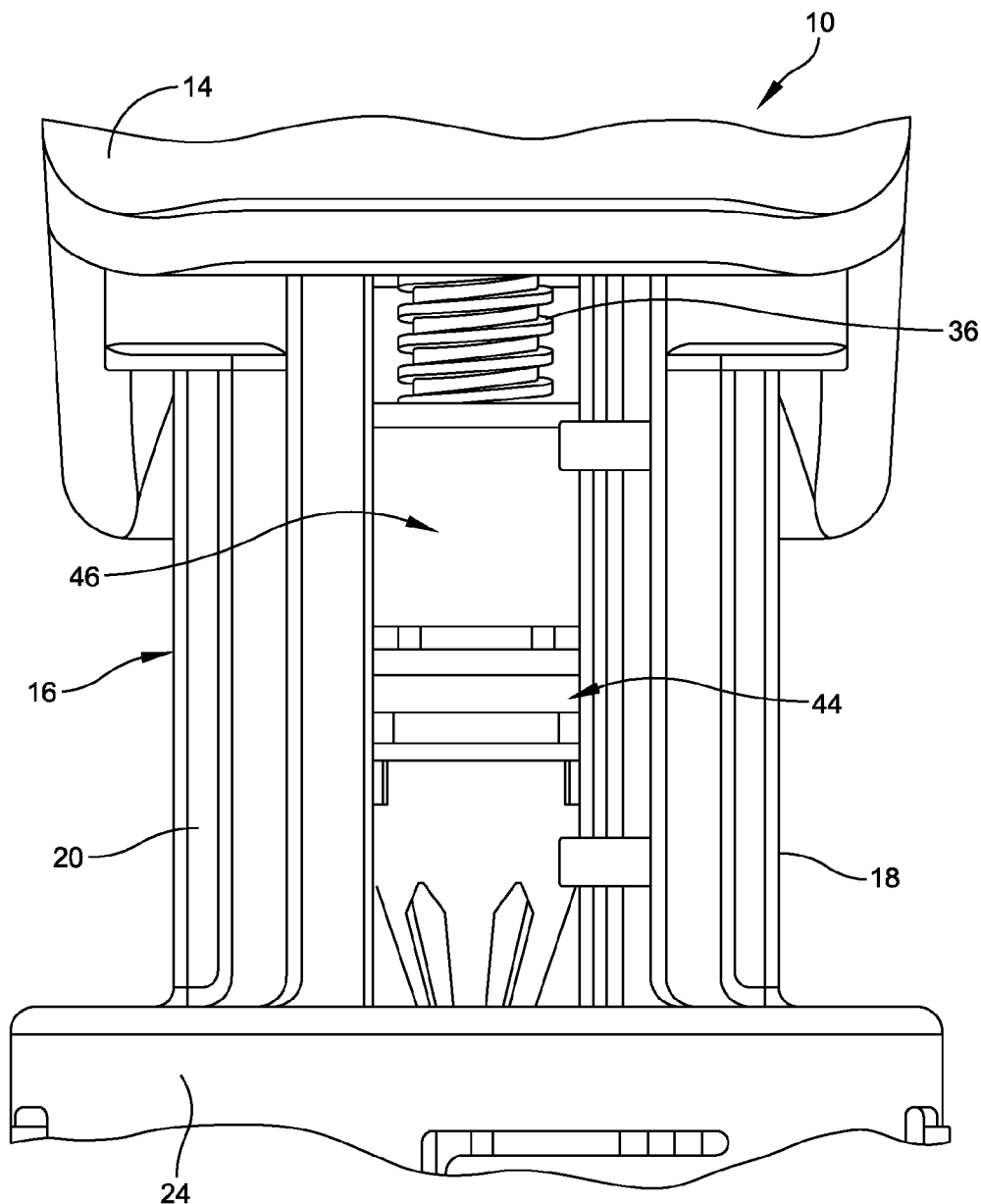

Referring to FIGS. 2 and 3, the globe valve actuator 10 includes a valve stem connector assembly, generally indicated at 40, which is designed to secure the valve stem 34 of the globe valve 12 to a lead screw 36 of the globe valve actuator. As shown, the valve stem connector assembly 40 is provided in the yoke 18 of the yoke assembly 16, and in one embodiment, includes a retainer, generally indicated at 44, which is secured to the lead screw 36 of the globe valve actuator 10, a retainer latch, generally indicated at 46, which is slid over the lead screw to engage the retainer, and two cams, each generally indicated at 48, which are secured to the retainer by pins, each indicated at 50. The components of the valve stem connector assembly 40 are designed to secure the valve stem 34 of the globe valve assembly 12 to the lead screw 36 of the globe valve actuator 10 without the use of tools, and to release the valve stem from the lead screw with use of a simple tool, e.g., a flat-head screwdriver. By simply moving the retainer latch 46 toward the retainer 44 activates the cams 48 to secure the cams within an annular recess 52 (shown in FIG. 6) formed in the valve stem of the globe valve assembly 12.

The retainer 44 includes a generally cylindrical retainer body 54 that is sized to fit over a lower end of the lead screw 36 of the globe valve actuator. Referring additionally to FIGS. 4-8, the retainer body 54 includes an outer surface 56 and an inner surface 58 having an inwardly projecting annular rim 60, which is designed to snap fit into a recess 62 formed in the lower end of the lead screw 36. In one embodiment, the retainer 44 is fabricated from a suitable plastic material, such as polycarbonate/acrylonitrile butadiene styrene (PC/ABS), which is sufficiently strong to secure the retainer in place on the lead screw 36 during operation of the globe valve actuator 10. The retainer 44 further includes two cam retention formations formed on opposite sides of the retainer body 54. Each cam retention formation has two outwardly projecting walls 64, 66. As shown, each wall 64, 66 includes an opening formed therein, with the openings being aligned with one another and sized to receive a respective pin 50 therein in a press fit manner. The walls 64, 66 of the cam retention formations are designed to secure the cams 48 to the retainer 44 in a manner in which the cams can freely rotate with respect to the retainer.

Each cam 48 includes a cam body 68 having an opening formed therein to receive a pin 50 therein. The arrangement is such that for each cam 48, the pin 50 is press fit into the openings of the walls 64, 66 and the opening of the cam body 68 to rotatably secure the cam to the its respective cam retention formation. The cam body 68 of each cam 48 further includes a cam surface 70 designed to initially engage the retainer latch 46 during operation to move the cam from a normally unlocked position to a locked position. The cam body 68 further includes a recessed portion 72 formed in the cam body, with the recessed portion being configured to receive the retainer latch 46 therein to maintain the cam in the locked position. The cam body 68 of each cam further includes a protrusion 74 that is positioned generally oppositely from the cam surface on the cam body. The protrusion 74 is designed to engage the valve stem 34 of the globe valve assembly 12 within the annular recess 52 provided in the valve stem. The operation of the cams 48 will be described in greater detail below with reference to FIGS. 8-11.

The retainer latch 46 includes a generally cylindrical retainer latch body 76 that is designed to slip over the lead screw 36 of the globe valve actuator 10 and a portion of the retainer 44 above the cam retention formations, i.e., the walls 64, 66. The arrangement is such that the body 76 of the retainer latch 46 slides axially along a length of the lead screw 36 when positioned on the lead screw. The body 76 of the retainer latch 46 includes an outer surface and an inner surface that forms the diameter of the retainer latch. The retainer latch 46 further includes two cam actuators, each indicated at 78, formed on opposite sides of the body 76 of the retainer latch on the outer surface of the body. Each cam actuator 78 projects downwardly from a lower edge of the body 76 of the retainer latch 46. Each cam actuator 78 is positioned on the body 76 of the retainer latch 46 so that when the retainer latch moves towards the retainer 44, the cam actuator engages the cam surface 70 of the cam 48 to rotate the cam so that the cam protrusion 74 travels toward the recess 52 of the valve stem 34. The body 76 of the retainer latch 46 further includes two projections, each indicated at 80, formed on opposite sides of the body of the retainer latch inboard of their respective cam actuator 78. As shown, each respective cam actuator 78 and projection 80 together form a slot 82, which is designed to receive a portion 84 of the cam 48 therein when the protrusion 74 enters the annular recess 52 formed in the valve stem 34. The retainer latch 46 further includes a release feature indicated at 86, which is designed to release the retainer latch from the retainer 44 in the manner described in greater detail below.

Figure 8:
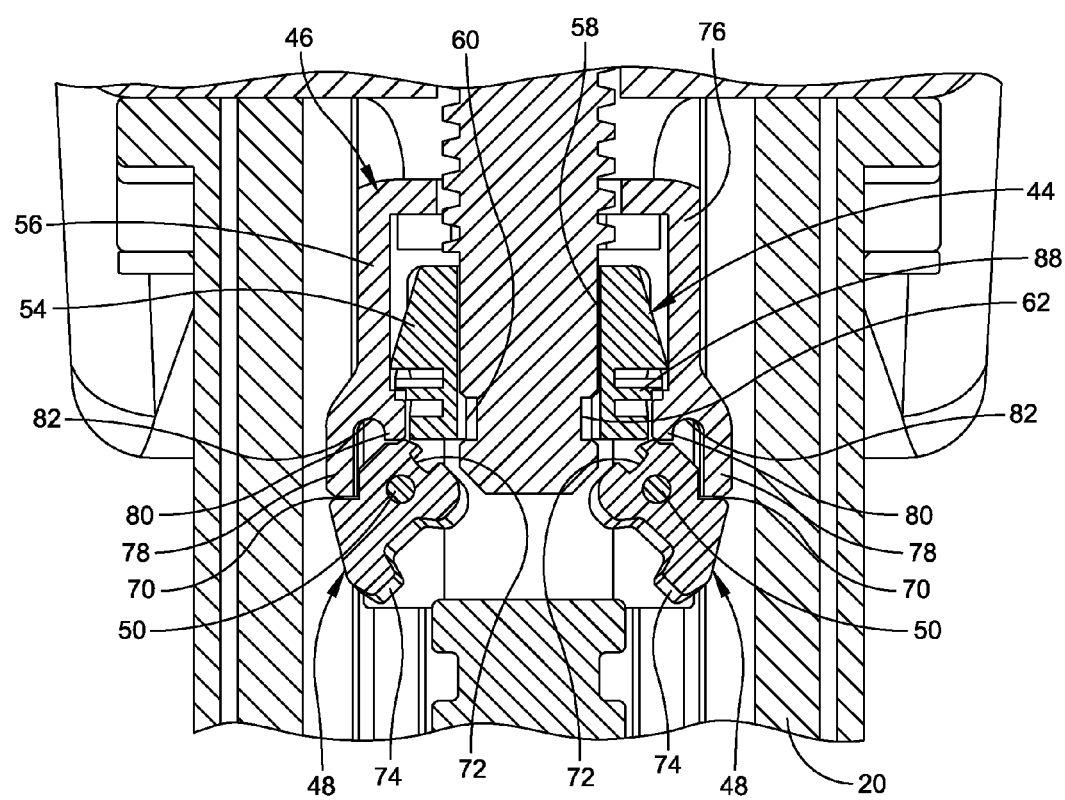
Figure 9:
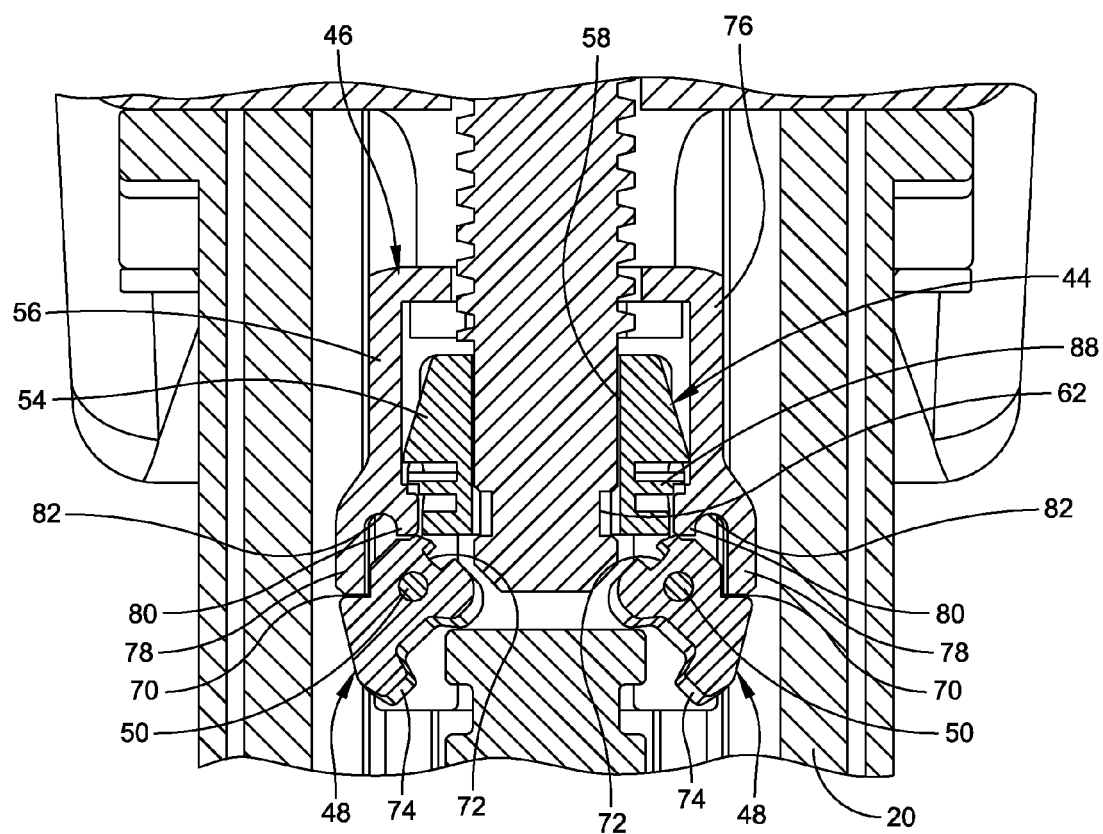
Figure 10:
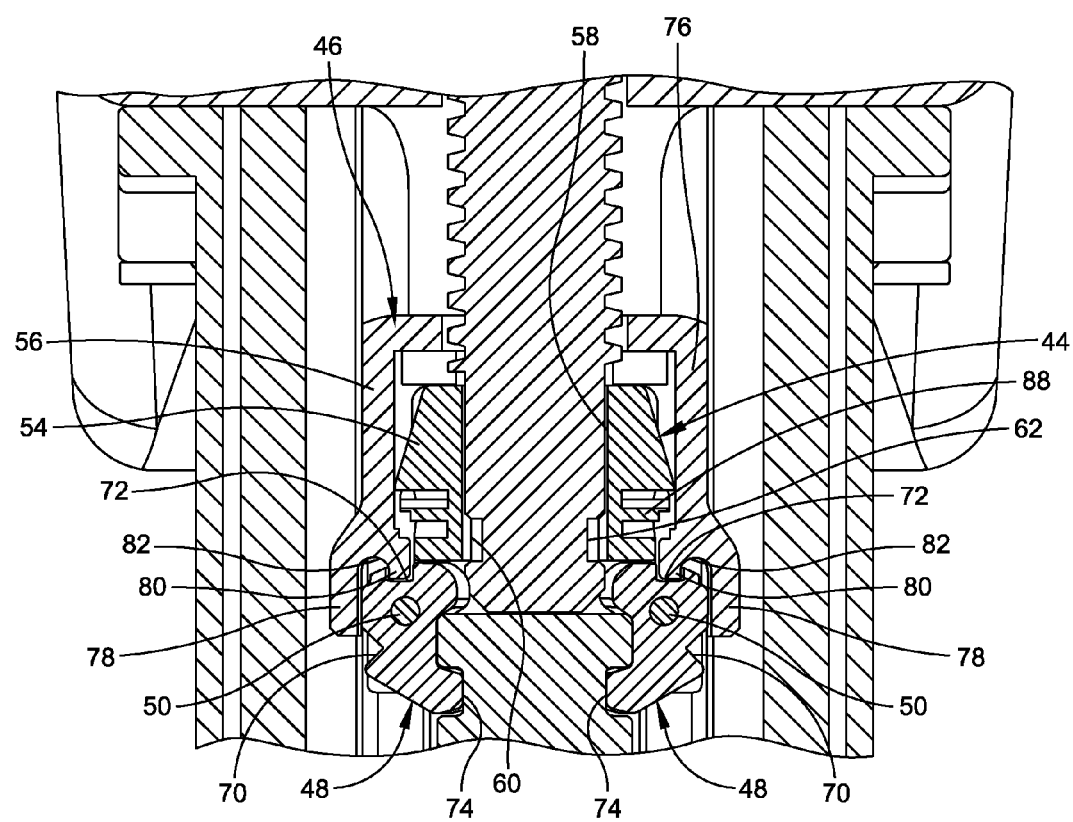
Figure 11:
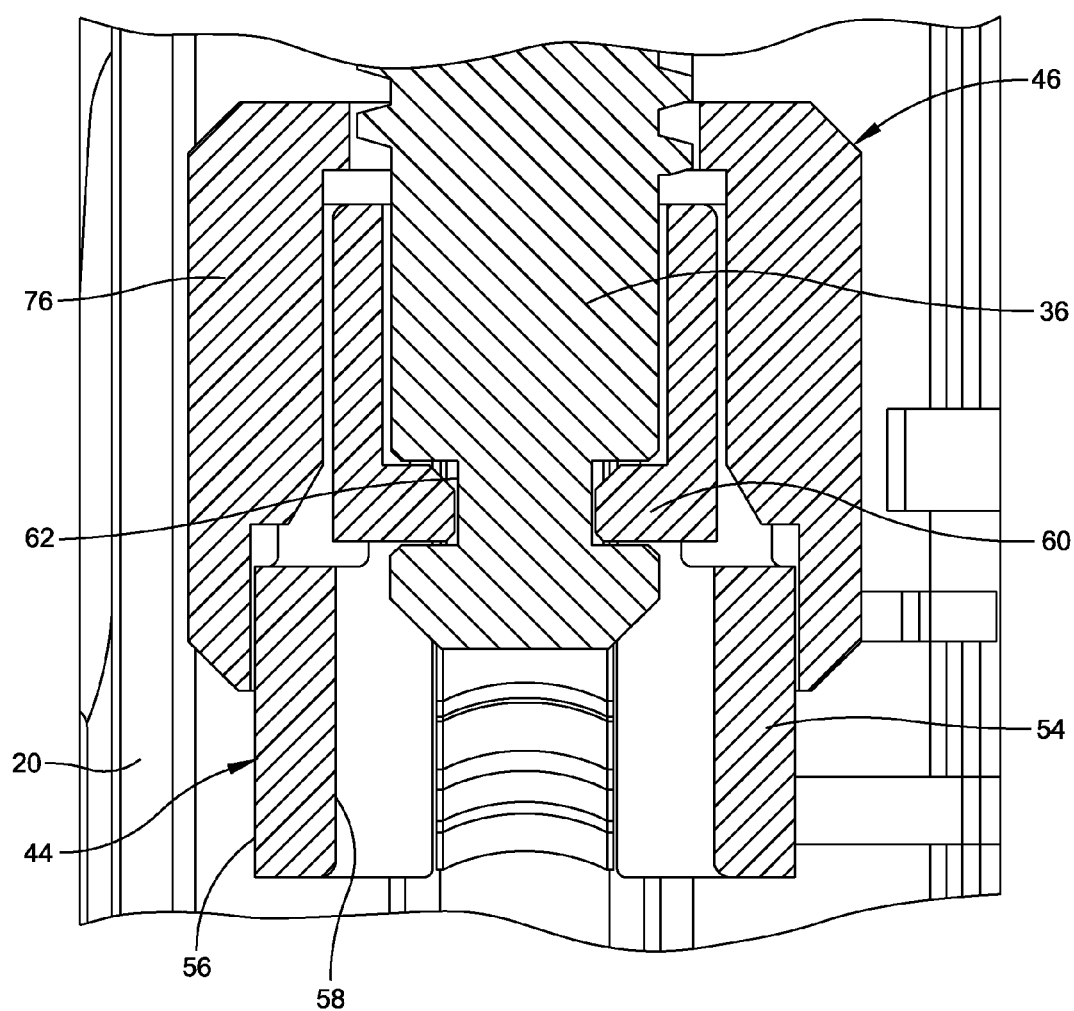

The manner in which the valve stem connector assembly 40 secures the valve stem 34 of the globe valve assembly 12 to the lead screw 36 of the globe valve actuator 10 will be described with reference to FIGS. 8-11. In FIG. 8, the retainer 44 of the valve stem connector assembly 40 is secured to the lower end of the lead screw 36 of the globe valve actuator 10. The retainer latch 46 is positioned above the retainer 44 so that the cam actuators 78 initially engage the cam surfaces 70 of the cams 48. The lead screw 36 is then lowered in a direction toward the valve stem 34 of the globe valve assembly 12. This is achieved by operating the motor of the globe valve actuator 10. In FIG. 9, as the lead screw 36 is lowered, the cam actuators 78 of the retainer latch 46 rotate the cams 48 provided on the retainer 44 so that the protrusions 74 of the cams rotate so that they travel toward the annular recess 52 formed in the valve stem 34. As shown in FIG. 9, a top surface of the valve stem 34 also engages portions of the cams 48 to further assist in the rotation of the cams. FIG. 10 illustrates the retainer latch 46 in its fully locked position in which the retainer latch is firmly seated on the retainer 44, the protrusions 74 of the cams 48 are received within the annular recess 52 of the valve stem 34, and the protrusions of the retainer latch are inserted into the recessed portions 72 of the cams.

The retainer 44 further includes two spring formations, each indicated at 88, formed on opposite sides of the retainer body 54 of the retainer. As best shown in FIG. 10, the spring formations 88 are configured to engage the inner surface of the retainer latch 46 to secure the retainer latch to the retainer 44 when in the locked position. Since the retainer latch 46 is fabricated from somewhat resilient material, e.g., plastic, the retainer latch can be manipulated or otherwise deformed to disengage the retainer latch from the spring formations 88 of the retainer 44 to release the retainer latch from the retainer.

Figure 12:
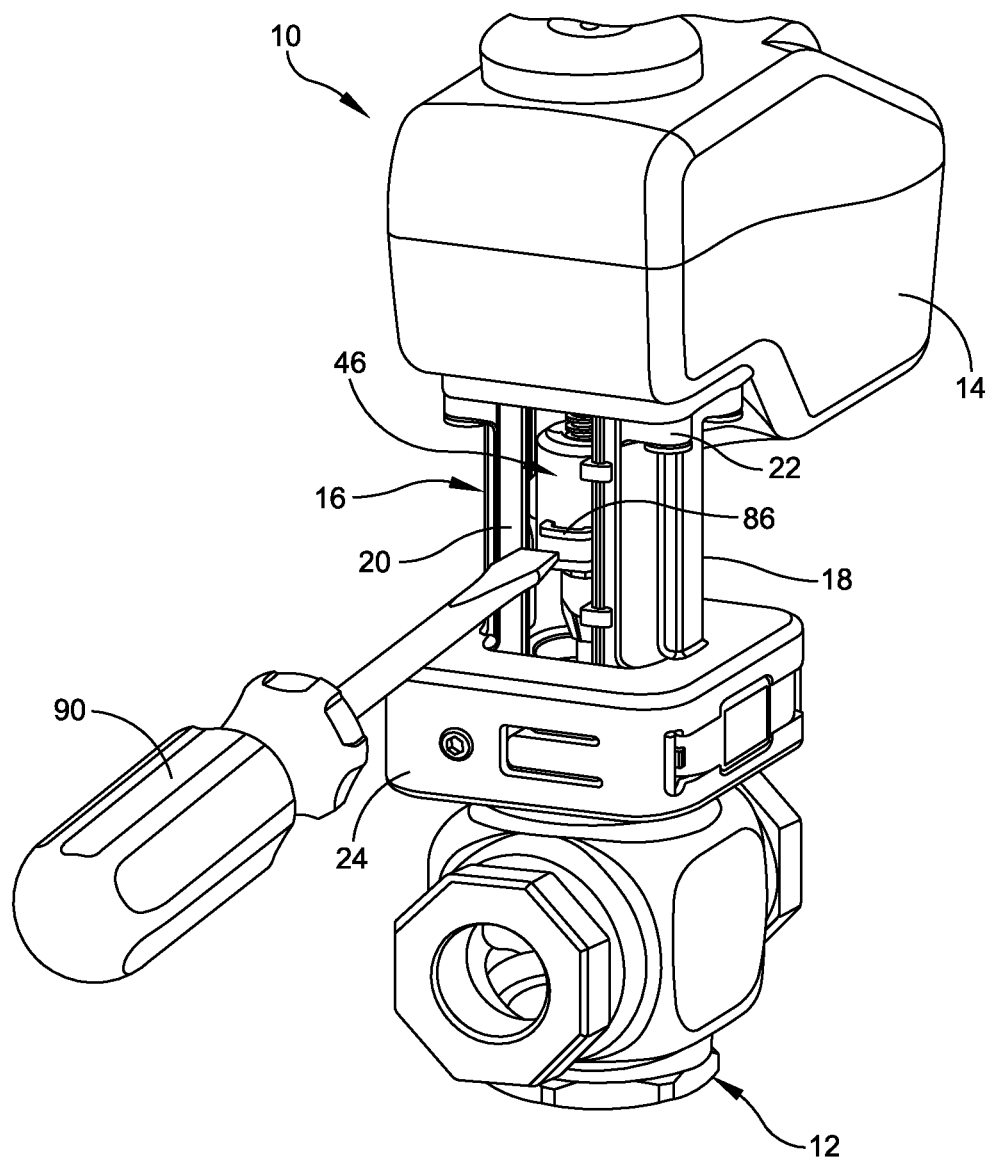
FIGS. 12 and 13 are perspective views showing a globe valve being released from a lead screw of the globe valve actuator by manipulating the connector assembly.
Figure 13:
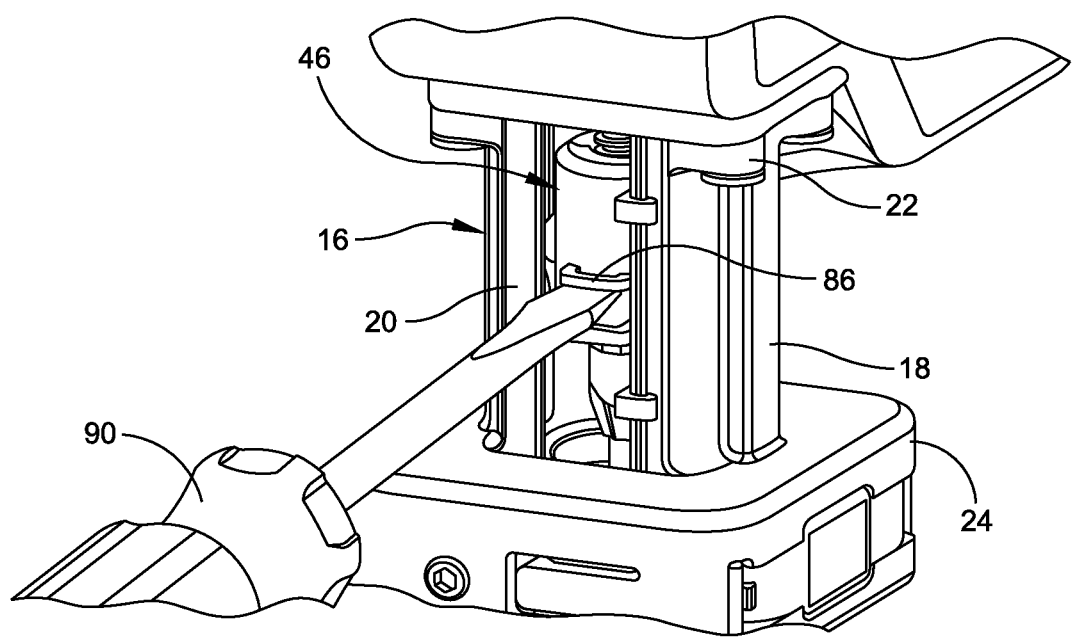

Referring to FIGS. 12 and 13, the manner in which the retainer latch 46 is removed from the retainer 44 will be described. As shown, an implement, such as a flat head screw driver 90, may be used to manipulate the release feature provided on the retainer latch. Specifically, the flat head of the screw driver 90 engages the release feature 86 to move the retainer latch 46 upwardly, thereby disengaging the spring formations 88 of the retainer 44 from the retainer latch. As the retainer latch 46 moves upwardly, the protrusions 74 of the cams 48 rotate in a direction so that they are removed from the annular recess 52 of the valve stem 34, and the projections 80 of the retainer latch 46 are removed from their respective recessed portions 72 of the cams. This movement of the retainer latch 46 achieves the unlocked position in which the cams 48 of the retainer rotate back to the position illustrated in FIG. 8.

Thus, it should be observed that the valve stem connector assembly 40 of embodiments of the present disclosure is capable of securing the valve stem 34 of the globe valve 12 to the lead screw 36 of the globe valve actuator 10 by hand without the aid of tools. To release the valve stem 34 of the globe valve 12 from the lead screw 36 of the globe valve actuator 10 can be achieved with a simple tool, such as screwdriver 90.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A valve stem connector assembly to connect a lead screw of a globe valve actuator to a valve stem of a globe valve, the valve stem connector assembly comprising:
    a retainer secured to the lead screw, the retainer including a retainer body and at least one cam rotatably secured to the retainer; and
    a retainer latch coupled to the lead screw and the retainer, the retainer latch being configured to move from a normally unlocked position in which the valve stem is unsecured from the lead screw and a locked position in which the retainer latch moves toward the retainer to rotate the at least one cam to secure the valve stem to the lead screw.

2. The valve stem connector assembly of claim 1, wherein the retainer body is generally cylindrical and sized to fit over a lower end of the lead screw of the valve actuator.

3. The valve stem connector assembly of claim 2, wherein the retainer body includes an outer surface and an inner surface having an inwardly projecting annular rim configured to snap fit into a recess formed in the lower end of the lead screw.

4. The valve stem connector assembly of claim 3, wherein the retainer further includes at least one cam retention formation formed on the retainer body of the retainer to rotatably secure the at least one cam to the retainer body.

5. The valve stem connector assembly of claim 1, wherein the at least one cam includes a cam body having a cam surface configured to initially engage the retainer latch to move the at least one cam from the normally unlocked position to the locked position.

6. The valve stem connector assembly of claim 5, wherein the at least one cam further includes a recessed portion formed in the cam body, the recessed portion being configured to receive the retainer latch therein to maintain the at least one cam in the locked position.

7. The valve stem connector assembly of claim 5, wherein the at least one cam further includes a protrusion configured to engage the valve stem of the globe valve assembly within the annular recess provided in the valve stem when the retainer latch is in the locked position.

8. The valve stem connector assembly of claim 7, wherein the retainer latch includes a generally cylindrical retainer latch body that is configured to slip over the lead screw of the globe valve actuator and a portion of the retainer.

9. The valve stem connector assembly of claim 8, wherein the retainer latch body of the retainer includes at least one cam actuator formed on the retainer latch body on the outer surface of the retainer latch body, the at least one cam actuator projecting downwardly from a lower edge of the retainer latch body to engage the cam surface of the at least one cam to rotate the at least one cam.

10. The valve stem connector assembly of claim 9, wherein the retainer latch body further includes at least one protrusion formed on the retainer latch body inboard of the at least one actuator to form a slot that is configured to receive a portion of the cam body of the at least one cam therein when the protrusion enters the recessed portion formed in the cam body.

11. The valve stem connector assembly of claim 10, wherein the retainer latch further includes a release feature configured to release the retainer latch from the retainer.

12. The valve stem connector assembly of claim 10, wherein the retainer further includes at least one spring formation formed on the retainer body, the at least one spring formation being configured to engage the inner surface of the retainer latch to secure the retainer latch to the retainer when in the retainer latch is in the locked position.

13. A method of releasably securing a valve stem of a globe valve to a lead screw of a globe valve actuator, the method comprising:
    securing a retainer to the lead screw, the retainer including a retainer body and at least one cam rotatably secured to the retainer; and
    moving a retainer latch coupled to the lead screw and the retainer from an unlocked position in which the valve stem is unsecured from the lead screw to a locked position in which the retainer latch moves toward the retainer to rotate the at least one cam to secure the valve stem to the lead screw.

14. The method of claim 13, wherein moving the retainer latch includes engaging a cam surface of the at least one cam to move the at least one cam from a normally unlocked position to the locked position.

15. The method of claim 14, wherein engaging the cam surface includes engaging at least one cam actuator formed on the retainer latch body on the outer surface of the retainer latch body to the cam surface to rotate the at least one cam.

16. The method of claim 15, wherein engaging the cam surface further includes inserting at least one protrusion formed on the retainer latch body inboard of the at least one cam actuator into a recessed portion formed in the cam body.

17. The method of claim 14, wherein moving the retainer latch further includes receiving the retainer latch within a recessed portion formed in the cam body.

18. The method of claim 17, wherein moving the retainer latch further includes inserting a protrusion of the at least one cam into the annular recess provided in the valve stem.

19. The method of claim 13, further comprising releasing the retainer latch from the retainer with a release feature formed on the retainer latch.

20. The method of claim 13, wherein the retainer further includes at least one spring formation formed on the retainer body, the at least one spring formation being configured to engage the inner surface of the retainer latch to secure the retainer latch to the retainer when in the retainer latch is in the locked position.

* * * * *